United States Patent [19]

Ruzzo

[11] Patent Number: 5,173,929
[45] Date of Patent: Dec. 22, 1992

[54] METHOD FOR DETERMINING THE THICKNESS OF A METALLIC COATING ON A GAS TURBINE BLADE

[75] Inventor: Patsy A. Ruzzo, West Chester, Ohio

[73] Assignee: General Electric Company, Cincinnati, Ohio

[21] Appl. No.: 783,736

[22] Filed: Oct. 28, 1991

[51] Int. Cl.$^5$ .............................................. G01B 15/02
[52] U.S. Cl. ........................................ 378/50; 378/44; 378/48
[58] Field of Search ...................... 378/44, 45, 48, 50, 378/46

[56] References Cited

U.S. PATENT DOCUMENTS

| 4,129,778 | 12/1978 | Inoue et al. | 378/50 |
| 4,959,848 | 9/1990 | Parobek | 378/45 |

FOREIGN PATENT DOCUMENTS 0111854  9/1979  Japan ................................. 378/50

OTHER PUBLICATIONS

D. P. Salamida, "Measurement of Selenium Thickness on Nickel Substrate Using Bremsstrahlung Radiation," *Radiochem Radioanal. Letters*, Mar. 1970, pp. 331–337.
"Standard Method for Measurement of Coating Thickness by X-ray Spectrometry"; ASTM Designation: B 568-85; Feb. 22, 1985.

*Primary Examiner*—David P. Porta
*Attorney, Agent, or Firm*—Jerome C. Squillaro; Charles L. Moore, Jr.

[57] ABSTRACT

A method for determining the thickness of an aluminide coating deposited on a gas turbine blade using X-ray spectrometry in which the turbine blade is formed from a nickel-based, high temperature alloy. The method establishes a characteristic secondary emission curve based upon the presence of a boundary layer or a layer of nickel permeating into the aluminide coating layer during the coating process. A characteristic secondary emission curve is formed based upon secondary emission characteristic of nickel. One end of the curve is established by a count rate corresponding to secondary radiation from substantially pure nickel and a second end of the curve corresponds to a count rate representative of secondary emission from either the base material or the coating material. The determination of whether to use the base material or the coating material is dependent upon whether the coating is applied by a packed powder process or by chemical vapor deposition and whether the measurements are to be taken in an emission mode or an absorption mode. In either event, the established curve is utilized by an X-ray spectrometry machine to correlate the count rate and fit the measured count rate onto the curve to provide a direct read-out of thickness of the coating.

8 Claims, 1 Drawing Sheet

METHOD FOR DETERMINING THE THICKNESS OF A METALLIC COATING ON A GAS TURBINE BLADE

The present invention relates to gas turbine engines and, more particularly, to a method for determining the thickness of a metallic coating on a gas turbine blade.

BACKGROUND OF THE INVENTION

Turbine blades for gas turbine engines operate in relatively harsh environments in which high velocity and high temperature gases erode the blade surfaces. Exotic alloys are used to form such blades in order to withstand the temperature extremes. Additionally, the blades are coated with other alloys or metals to improve surface resistance to ablation. It is desirable that the surface coatings on such blades be uniform and have a preselected thickness. It is therefore desirable to have some nondestructive method of confirming uniformity and thickness of coatings on such blades.

One nondestructive test procedure for measuring thickness of coatings on a substrate utilizes X-ray spectrometry and is described in ASTM Standard B 568-85. In X-ray spectrometry, the measurement of coating thickness is based upon the combined interaction of the coating and substrate with incident radiation of sufficient energy to cause the emission of secondary radiations characteristic of the coating and substrate. As is well known, when an element of a particular atomic number is excited by radiation, the secondary emission of radiation from that element will be characteristic of that element. Spectral analysis of the secondary radiation can be used to identify the emitting element. Furthermore, the amount of secondary radiation within certain limits is proportional to the thickness of the element when the exciting radiation is of constant intensity.

ASTM Standard B 568 outlines procedures for determining coating thickness using the basic premises discussed above. The procedures include one based upon secondary radiation absorption and one based upon secondary radiation emission. In the procedure using secondary X-ray emission detection, a spectrometer is positioned to record the intensity of a prominent wavelength characteristic of a coating metal or, in the case of an energy dispersive system, a multi-channel analyzer may be set to accept the range of energies comprising the desired characteristic emission. The intensity of the coating's X-ray emission will be at a minimum for a sample of the bare substrate. The detected emissions may consist of that portion of the substrate fluorescence which may overlap the fluorescence of the coating and any contributions due to background radiation. If the characteristic emission energies of the coating and substrate are sufficiently different, the only contribution of the substrate to the detected emission will be due to background. For a thick sample of solid coating metal or for a plated specimen having an infinitely thick coating, the secondary radiation intensity emitted will have its maximum value. For a sample having a coating of less than "infinite" thickness (actually a finite value less than a predetermined maximum), the intensity will have some intermediate value. The intensity of the emitted secondary X-ray radiation depends, in general, upon the excitation energy, the atomic numbers of the coating and substrate, the area of the specimen exposed to the primary radiation, the power of the X-ray tube, and the thickness of the coating. If all of the other variables are fixed, the intensity of the characteristic secondary radiation can be made a function of the thickness of mass per unit area of the coating. The exact relationship between the measured intensity and the coating thickness must be established by the use of standards having the same coating and substrate compositions as the samples to be measured. In a typical application, measurements are taken of a sample in such a manner as to establish a minimum intensity of the coating material emission for a bare substrate and a maximum intensity for a coating of infinite thickness. The infinite thickness may be obtained by exposing a block of material formed of the coating material to the X-ray radiation and measuring the intensity of the secondary radiation from the block material. The minimum and maximum secondary emissions establish the end points of a curve in which the midpoints can now be found by exposing substrates having different thicknesses of coatings to the X-ray radiation and measuring the emitted secondary radiation. The samples of coated products may be destructively tested to determine the actual thickness of the coating. FIG. 1 illustrates a typical curve or characteristic of a metallic coating on a metallic substrate. Any intermediate values of coating thickness will fall somewhere on the curve so that the count rate of secondary radiation emission can be converted directly to a thickness of coating.

A second procedure for measuring coating thickness uses the technique of X-ray absorption. In X-ray absorption, the secondary emission detector is set to record the intensity of a selected emission characteristic of the metal of the substrate. The intensity of the secondary emissions from the substrate metal will be a maximum for a sample in which the substrate metal is not coated and the intensity will decrease with increasing coating thickness. In this instance, an infinite coating thickness will result in a minimum detectable secondary emission radiation. The reason for the decreasing detectable secondary emission is that both the exciting and secondary characteristic radiations undergo attenuation in passing through the coating. The measurement of a coating thickness using the X-ray absorption technique is not applicable if any intermediate coating is present because there are indeterminate absorption effects of the intermediate layer. FIG. 2 illustrates a typical characteristic relationship between coating thickness and intensity of a characteristic emission from a substrate using the X-ray absorption technique.

The use of X-ray spectrometry to measure coating thickness on aircraft gas turbine blades formed of high temperature alloys such as Rene metal (such as type N5 or R80) has not resulted in consistently accurate results. Commercially available X-ray spectrometry thickness gauges utilize information obtained from samples placed in the gauges to construct characteristic secondary emission curves for use in thickness measurements. These gauges are typically microcomputer devices which collate the data from samples and use the collated data to directly convert count rates on actual products to a direct readout of thickness of a coating. In using these commercially available thickness gauges, Applicant has found that the readings provided by these gauges have not corresponded to actual measurements taken of coating thicknesses using destructive testing.

SUMMARY OF THE INVENTION

The present invention overcomes the disadvantages of the prior art and provides a method for utilizing X-ray spectrometry for measuring coating thickness of a metallic material deposited on a turbine blade from a gas turbine engine. More particularly, the present invention is described in the context of a procedure which allows use of the X-ray spectrometry method set forth in ASTM Standard B-568 to measure coating thickness on a turbine blade constructed of Rene metal. Applicant has found that the discrepancies occurring in the prior use of X-ray spectrometry occurred because of unique characteristics of the turbine alloy in conjunction with the application of the coating material onto the alloy. The present invention discloses a method for determining the thickness of a coating deposited on a metallic substrate of Rene material using X-ray spectrometry in which the coating comprises a metallic material. The invention includes determining the presence of a boundary layer or of a leaching of material from the metallic substrate into the coating so that the secondary emission is effected by the presence of the boundary layer or the material leached into the coating. In the case of a boundary layer, a calibration characteristic for measurement of thickness is established such that one end of the calibration characteristic is set by secondary radiation from the material which leached from the base substrate. Another end of the calibration curve then corresponds to the pure form of the coating material. In the second instance in which a metal is leached from the base material and permeates into the coating material, the calibration characteristic is established such that one end of the calibration characteristic is set by secondary emission from a substantially pure sample of the leached material and another end of the characteristic is set by secondary emission from the base material. In either of the above instances, at least one end of the calibration characteristic is established by the material which leaches out of the base material. Applicant has found that this leaching action creates a different secondary emission characteristic which has heretofore caused the nondestructive testing using X-ray spectrometry to be in error. By establishing the identity of the leach material and then using the leach material as one end of the calibration characteristic, the thickness of the coating can then be determined using either emission or absorption techniques, depending upon how the coating is established. In one form, the coating is established by placing the base material into a powder at sufficiently high temperature to cause the powder to adhere to the outer surface of the base material. For this type of coating, the leaching action causes a boundary layer of metal to be formed over the base metal between it and the coating. In another form, the coating is applied using chemical vapor deposition (CVD) and Applicant has found that a metal leaches out of the base material and permeates into the CVD coating. The thickness or penetration of the leach material into the CVD coating is a function of the thickness of the CVD coating. In this last instance, Applicant has found that direct measurement of emission is preferable over the absorption technique.

BRIEF DESCRIPTION OF THE DRAWINGS

For a better understanding of the present invention, reference is made to the following detailed description taken in conjunction with the accompanying drawings in which.

DETAILED DESCRIPTION OF THE INVENTION

Gas turbine blades are typically formed of a material identified as Rene material which is a nickel-based alloy. Rene type N5 or R80 are typical alloys. In gas turbine engines, this nickel-based alloy is covered with an aluminide coating. The aluminide coating may be an alloy itself or may be a pure aluminum material. In the past, there has been no nondestructive means to measure coatings applied to gas turbine blades of this material since the calibration curves generated by conventional spectroanalyzers or spectrometry machines have been found to be inaccurate. Applicant has found that the inaccuracy in prior art equipment is attributable to leaching of nickel material from the alloy forming the turbine blade either into a substantially pure boundary layer of nickel overlaying the blade and existing below the coating or by permeating into the coating itself. The pure boundary layer problem has been found to occur when the aluminide coating is applied to the Rene metal in a packed powder process. In this process, the heated blade is positioned in a container of the aluminide powder so that the powder particles adhere to and bond to the blade surface. During this bonding process, pure nickel leaches out of the Rene metal and forms the boundary layer between the underlying substrate of the blade and the aluminide coating. In an alternate process using chemical vapor deposition (CVD), the blade is exposed to the chemical vapor, which again may be an aluminide material, for sufficient time to allow a coating of a predetermined thickness to be adhered to the blade surface. In this process, the blade itself is also heated and Applicant has found that pure nickel leaches from the Rene metal and permeates into the aluminide coating. In the CVD process, Applicant has found that the penetration of the pure nickel into the aluminide coating is time dependent such that it becomes directly proportional to the thickness of the coating.

Figure 1:
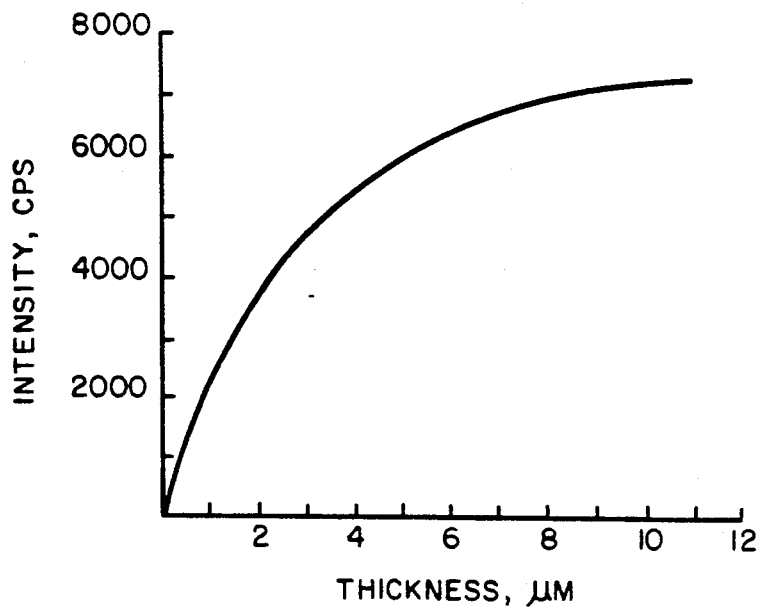
FIG. 1 is an exemplary characteristic curve illustrating the relationship between coating thickness and secondary emission intensity using the emission technique.
Figure 2:
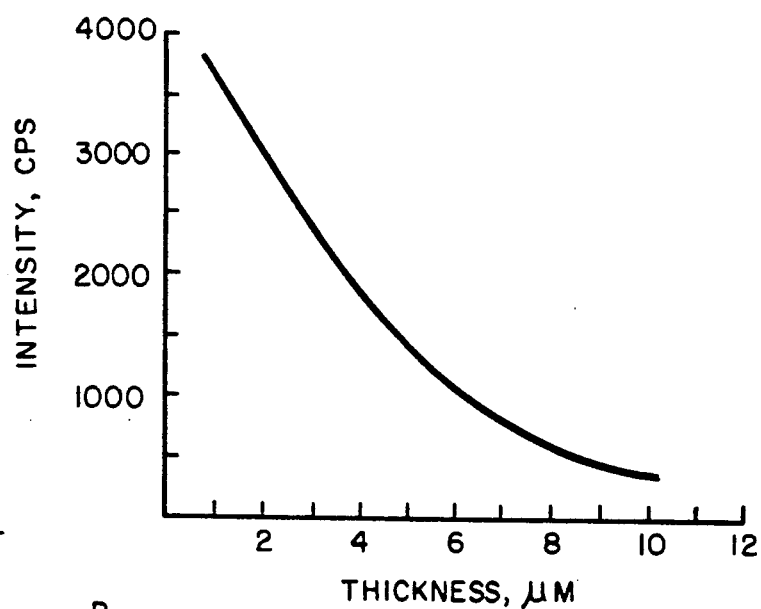
FIG. 2 is a typical characteristic curve of coating thickness versus intensity of a characteristic emission using an absorption technique.
Figure 3:
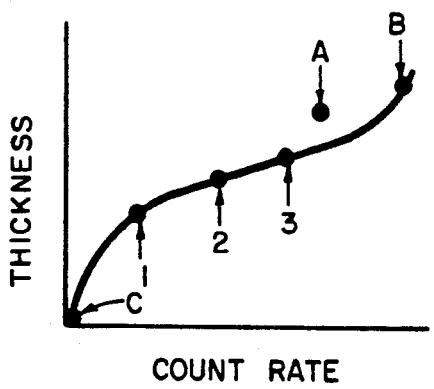
FIG. 3 is a typical curve obtained by a spectroanalyzer applied to the materials in gas turbine blades.
Figure 4:
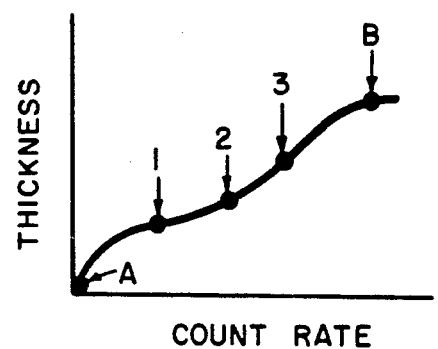
FIG. 4 is a typical characteristic of an adjusted curve for a gas turbine blade using the teachings of the present invention.

With this information in mind, reference is made to FIG. 3 which illustrates how a characteristic curve is generated in commercially available spectrometers for the emission mode of measuring. An upper end of the characteristic curve labeled at point B corresponds to the characteristic secondary emission radiation or count rate attributable to excitation of an infinite thickness of coating of aluminum. The points 1, 2, and 3 on the curve represent aluminum characteristic emissions corresponding to known samples of predetermined thicknesses of aluminum on a base substrate. A characteristic curve is generated from zero thickness and zero count rate through these points 1, 2, and 3 and up to the point B corresponding to an infinite thickness coating. The lower point of the curve at C should actually correspond to the characteristic aluminum secondary emission from the base material which, in the absence of scatter or overlapping fluorescence, is nominally zero for a non-aluminum containing alloy. However, as described above, pure nickel leaches out of the base material so that a count rate is generated corresponding to point A. Since point A is interpreted by the spectrometer as a lower point of the curve rather than the position in which it is shown, the computer associated with the spectrometer is unable to plot the curve since it does not appear to be single valued. A similar curve is generated if the absorption method is used although the count rate is attributable to the secondary emission characteristic of the base Rene metal with a lower count rate being indicative of a thicker coating. The point A then corresponds to the higher count rate attributable to the pure nickel layer. Given Applicant's discovery that pure nickel leaches from the Rene base material during the coating process, a second curve can be generated by Applicant's method in which pure nickel is used as the base material resulting in a count rate that can be plotted on a single value curve. Referring to FIG. 4, there is shown a characteristic curve in which pure nickel has been used as the base material to establish a point on the curve corresponding to zero thickness of the coating. Since this curve is now single valued, the computer can plot the curve and therefore can generate a count rate versus thickness result. Note that the error indicated by the count rate at A in FIG. 3 is attributable to a higher count rate at the nickel characteristic emission from the nickel coating than is obtainable from the nickel-based alloy material. As shown in FIG. 4, pure nickel is then used as the base material for calibration purposes to adjust the curve so that an accurate reading of coating thickness can be made.

The above described procedure is utilized when the aluminide coating is applied to the Rene metal substrate of the turbine blade using a packed powder process. In the CVD process, the nickel from the Rene metal has been found to leach into the CVD applied aluminide coating rather than form a boundary layer. The normal method of generating a calibration curve for measuring the coating thickness would be to use the characteristic emission of the base material, such as Rene N5, as one end of the curve and the value of this same emission characteristic from the coating material alone, the aluminide material, as the opposite end of the curve. Several samples of known coating thickness over Rene metal can then be used to fill in the rest of the characteristic curve between the extremes. When a part is then checked using the spectrometer for thickness of coating, the count rate would fall somewhere on the curve, thus indicating the actual coating thickness. Normally for CVD coatings, the process is done in the absorption mode, i.e., the base metal is excited and the thickness is determined by the secondary emissions detected from the base material. However, it has been found that the absorption mode does not work on this material for reasons similar to that described above. Accordingly, Applicant has found that accurate measurements can be made by using the characteristic emission of the base material of Rene N5 as one end of the characteristic curve and the value of the same emission from a pure nickel sample as another end of the characteristic curve, where the pure nickel sample represents a coating of infinite thickness. The samples of known coating thickness can be then used to fill in the curve between these two extremes. In addition, rather than use the absorption mode, it is preferable to use the emission mode. The emission mode works much better since the CVD process causes the nickel from the Rene material to migrate into the aluminide coating making it nickel enriched. When the X-ray radiation excites the coated material, that material appears to have more nickel in it than is found in the base material of Rene N5. Therefore, the count rate for the nickel base material at the nickel characteristic is the lower end of the calibration curve and the count rate for a pure nickel characteristic emission becomes the upper end of the calibration curve. With this information, the procedure set forth in ASTM Standard B-568 can then be used to accurately determine the thickness of aluminide coatings on Rene materials.

While the invention has been described in what is considered to be a preferred embodiment, it is intended that the invention not be so limited but be interpreted within the full spirit and scope of the appended claims.

What is claimed is:

1. A method for determining the thickness of an aluminide coating deposited on a gas turbine blade using X-ray spectrometry, the turbine blade being formed from a nickel-based, high temperature alloy, the method comprising the steps of:
    determining the presence of a boundary layer of substantially pure nickel disposed between the aluminide coating and the turbine blade, the boundary layer being created by leaching of nickel from the nickel-based alloy upon application of the aluminide coating to the blade; and
    establishing a secondary radiation emission calibration characteristic for measurement of thickness of the coating using X-ray spectrometry wherein one end point of the characteristic secondary radiation corresponds to secondary radiation from substantially pure nickel.

2. The method as set forth in claim 1 wherein the establishing step includes establishing a minimum thickness corresponding to secondary radiation emission characteristic of a substantially pure sample of nickel and establishing a maximum thickness corresponding to secondary radiation emission characteristic of nickel from a substantially pure sample of the aluminide coating.

3. The method of claim 1 wherein the aluminide coating is applied by chemical vapor deposition, the boundary layer comprising a permeation of nickel into the aluminide coating, and the step of establishing includes the steps of establishing a minimum thickness corresponding to secondary radiation characteristic of nickel from an uncoated blade of the nickel-based alloy and establishing a maximum thickness corresponding to secondary radiation characteristic of a substantially pure sample of nickel.

4. A method for determining the thickness of a coating deposited on a metallic substrate using X-ray spectrometry, the coating comprising a first preselected material and the substrate comprising a second preselected material, the method comprising the steps of:
    determining the presence of a boundary layer of a third material different from the first and second material and disposed between the first and the second materials, the boundary layer being created by leaching of the third material from the substrate upon application of the coating to the substrate; and establishing a calibration characteristic for measurement of thickness of the coating using X-ray spectrometry wherein one point on the calibration characteristic corresponds to secondary radiation from the third material.

5. The method as set forth in claim 4 wherein the establishing step includes establishing a minimum thickness corresponding to secondary radiation from a substantially pure sample of the third material and establishing a maximum thickness corresponding to secondary radiation characteristic of the third material from a substantially pure sample of the first material.

6. The method of claim 4 wherein an emission method of thickness determination is utilized and the step of establishing includes establishing a minimum thickness corresponding to secondary radiation of a predetermined emission characteristic from a substantially pure sample of the second material and establishing a maximum thickness corresponding to secondary radiation of the predetermined emission characteristic from a substantially pure sample of the third material.

7. The method of claim 6 wherein the substrate comprises a nickel alloy and the third material is substantially pure nickel, each of the steps of establishing including the step of detecting secondary radiation emission characteristic of substantially pure nickel.

8. A method for determining the thickness of a coating on a turbine blade formed from a nickel-based alloy using X-ray spectrometry, the coating being applied by chemical vapor deposition such that nickel leaches out of the blade and permeates into the coating, the method comprising the steps of:
   establishing a characteristic emission curve having one end point defined by secondary radiation emission characteristic of substantially pure nickel and a second end point defined by secondary radiation emission from the turbine blade corresponding to secondary radiation emission from nickel; and
   exposing a blade to primary X-ray radiation and measuring the magnitude of secondary radiation emission characteristic of nickel for determining coating thickness.

* * * * *